United States Patent
Kouyama et al.

(10) Patent No.: US 9,028,965 B2
(45) Date of Patent: May 12, 2015

(54) HEAT STORAGE MICROCAPSULES AND MANUFACTURING METHOD THEREOF

(75) Inventors: Mikio Kouyama, Tokyo (JP); Ken Ohmura, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 498 days.

(21) Appl. No.: 13/311,761

(22) Filed: Dec. 6, 2011

(65) Prior Publication Data

US 2012/0148845 A1    Jun. 14, 2012

(30) Foreign Application Priority Data

Dec. 13, 2010   (JP) ................................ 2010-276696

(51) Int. Cl.
| | | |
|---|---|---|
| B32B 15/02 | (2006.01) | |
| B05D 7/00 | (2006.01) | |
| B32B 3/00 | (2006.01) | |
| C09K 5/06 | (2006.01) | |
| F28D 20/02 | (2006.01) | |

(52) U.S. Cl.
CPC .............. *C09K 5/063* (2013.01); *F28D 20/023* (2013.01); *Y02E 60/145* (2013.01)

(58) Field of Classification Search
CPC .... C09D 11/322; C09D 11/54; C09D 7/1275; C09D 7/1291; C09D 11/037; C09D 175/04; C09D 7/1266; B01J 13/14; B01J 20/285; B82Y 30/00; C01P 2004/64; C01P 2004/03; C01P 2004/32; C01P 2004/62
USPC ............. 524/591; 428/402–402.24, 403, 404, 428/407, 321.1, 474.4; 427/331, 389.9, 427/212, 213–213.36, 483, 256; 264/534, 264/5, 41, 4–4.7; 424/400, 408, 450, 451, 424/455, 93.7, 184.1, 497, 489, 501, 490, 424/491, 492, 493, 494, 495; 252/70
See application file for complete search history.

(56) References Cited

U.S. PATENT DOCUMENTS

| | | | | |
|---|---|---|---|---|
| 5,393,637 | A | * | 2/1995 | Kanda et al. ................... 430/138 |
| 6,753,083 | B2 | * | 6/2004 | Mistry et al. ................... 428/402 |
| 2008/0008858 | A1 | * | 1/2008 | Hong et al. ................... 428/143 |
| 2010/0087115 | A1 | * | 4/2010 | Davis et al. ................... 442/136 |

FOREIGN PATENT DOCUMENTS

| | | |
|---|---|---|
| JP | 62-001452 | 1/1987 |
| JP | 62-149334 | 7/1987 |
| JP | 62-225241 | 10/1987 |
| JP | 02-258052 | 10/1990 |

* cited by examiner

*Primary Examiner* — James J Seidleck
*Assistant Examiner* — S. Camilla Pourbohloul
(74) *Attorney, Agent, or Firm* — Lucas & Mercanti, LLP

(57) ABSTRACT

Disclosed are heat storage microcapsules encapsulating a water-soluble heat storage material stably and certainly, heat storage microcapsules with high durability which prevent phase separation of an inorganic salt hydrate latent heat storage material, heat storage microcapsules which prevent supercooling of a latent heat storage material to exhibit stable heat history and a manufacturing method thereof. The heat storage microcapsules comprise a core covered with a shell, wherein the core contains (a) at least one water-soluble latent heat storage material selected from a salt hydrate and a sugar alcohol and (b) a polymer derived from a water-soluble monomer mixture of a water-soluble monofunctional monomer and a water-soluble multifunctional monomer, and the shell is composed of a hydrophobic resin.

14 Claims, No Drawings

HEAT STORAGE MICROCAPSULES AND MANUFACTURING METHOD THEREOF

This application is based on Japanese Patent Application No. 2010-276696, filed on Dec. 13, 2010 in Japanese Patent Office, the entire content of which is hereby incorporated by reference.

FIELD OF THE INVENTION

The present invention relates to microcapsules encapsulating a latent heat storage material, and particularly to microcapsules with a large quantity of latent heat encapsulating a water-soluble latent heat storage material and a manufacturing method thereof.

TECHNICAL BACKGROUND

In recent years, there is demanded a method for effectively utilizing heat energy and saving energy. As such a method, a method has been proposed in which heat is stored, employing latent heat associated with phase change of a material. As compared with a method employing only sensible heat which is not associated with phase change, this method has advantages in that a heat storage material volume can be reduced because a large quantity of heat energy can be stored with high density in a narrow temperature region including a melting point and heat loss can be suppressed because no large temperature difference occurs for a large quantity of storage heat.

In order to increase heat exchange efficiency of a heat storage material, a method has been proposed which microencapsulates the heat storage material. As a method to microencapsulate a heat storage material, there are an encapsulation method according to a composite emulsion method (for example, refer to Japanese Patent O.P.I. Publication No. 62-1452), a method which forms a thermoplastic resin layer on the surface of heat storage material particles in a liquid (for example, refer to Japanese Patent O.P.I. Publication No. 62-149334), a method which forms a polymer layer derived from polymerization of a monomer on the surface of heat storage material particles (for example, refer to Japanese Patent O.P.I. Publication No. 62-225241), and a method which manufactures microcapsules having on the surface a polyamide layer formed according to interface polymerization (for example, refer to Japanese Patent O.P.I. Publication No. 2-258052).

In most of the microencapsulating methods above, heat storage material microcapsules are dispersed in a medium to form a heat storage material microcapsule dispersion. The dispersion makes it possible to easily transport in various apparatus. Further, the dispersed microcapsules in the dispersion can be dried and extracted as a solid component, whereby the heat storage material can be kept in the solid state whatever state it may originally be.

As a phase change heat storage material, aliphatic hydrocarbon compounds such as tetradecane and hexadecane are employed. These compounds melt or solidify at a relatively low temperature, and are suitable to micro-encapsulation described above. However, careful attention must be paid to use these, since these have a small latent heat amount and are likely to catch fire.

In contrast, an inorganic salt hydrate and sugar alcohol are preferably employed as a heat storage material, since they have a large latent heat amount and are difficult to catch fire at high temperature. The inorganic salt hydrate and sugar alcohol are water-soluble, and therefore, they need to be microencapsulated according to a method in which they are incorporated in a water immiscible organic solvent to form a W/O emulsion and then the surface of the resulting emulsified particles is covered with a hydrophobic resin layer. However, this method is difficult to form a stable emulsion, and therefore, it is difficult that the water-soluble latent heat storage material is completely encapsulated. Further, this method has problem in durability, that is, the inorganic salt hydrate, when subjected to repeated heating and cooling cycles, causes lowering of latent heat due to phase separation, and the latent heat storage material causes lowering of the quantity of latent storage heat due to supercooling phenomenon.

SUMMARY OF THE INVENTION

An object of the invention is to provide heat storage microcapsules encapsulating a water-soluble heat storage material stably and certainly. Another object of the invention is to provide heat storage microcapsules with high durability which prevent phase separation of an inorganic salt hydrate latent heat storage material, heat storage microcapsules which prevent supercooling of a latent heat storage material to exhibit stable heat history and a manufacturing method thereof. The heat storage microcapsules of the invention comprise a core covered with a shell, wherein the core contains (a) at least one water-soluble latent heat storage material selected from a salt hydrate and a sugar alcohol and (b) a polymer derived from a water-soluble monomer mixture of a water-soluble monofunctional monomer and a water-soluble multifunctional monomer, and the shell is composed of a hydrophobic resin.

DETAILED DESCRIPTION OF THE INVENTION

In view of the above, the present inventors have made an enthusiastic study, and have found that the above object can be attained by any one of the following constitutions.

1. Heat storage microcapsules comprising a core covered with a shell, wherein the core contains (a) at least one water-soluble latent heat storage material selected from a salt hydrate and a sugar alcohol and (b) a polymer derived from a water-soluble monomer mixture of a water-soluble monofunctional monomer and a water-soluble multifunctional monomer, and the shell is composed of a hydrophobic resin.

2. The heat storage microcapsules of item 1 above, wherein the polymer forms a three dimensionally crosslinked polymer matrix obtained from polymerization of the water-soluble monomer mixture of a water-soluble monofunctional monomer and a water-soluble multifunctional monomer.

3. The heat storage microcapsules of item 1 above, wherein the hydrophobic resin is at least one selected from the group consisting of polyamide, polyurethane, polyurea, polyurethaneurea and polyester.

4. The heat storage microcapsules of item 3 above, wherein the hydrophobic resin is polyamide or polyurethane.

5. The heat storage microcapsules of item 1 above, wherein the water-soluble latent heat storage material is the salt hydrate.

6. The heat storage microcapsules of item 5 above, wherein the salt hydrate is at least one selected from the group consisting of one or more hydrates of magnesium chloride, sodium acetate, aluminum sulfate, ammonium aluminum sulfate, ammonium potassium sulfate, magnesium sulfate and sodium phosphate.

7. The heat storage microcapsules of item 1 above, wherein the water-soluble latent heat storage material is the sugar alcohol.

8. The heat storage microcapsules of item 7 above, wherein the sugar alcohol is at least one selected from the group consisting of xylitol, threitol, erythritol, galactitol, iditol and dulcitol.

9. The heat storage microcapsules of item 1 above, wherein the water-soluble monofunctional monomer is at least one selected from the group consisting of (meth)acrylamides, alkylene glycol mono(meth)acrylates, (meth)acrylic acid or its salts and N-vinyl pyrrolidone, and the water-soluble multifunctional monomer is at least one selected from the group consisting of bis(meth)acrylamides, alkylene glycol di(meth)acrylates, pentaerythritol diallyl ether, pentaerythritol triallyl ether, pentaerythritol tetraallyl ether, trimethylol propane triallyl ether, trimethylol propane diallyl ether and ethylene glycol diallyl ether.

10. The heat storage microcapsules of item 1 above, wherein a content rate by mass of the water-soluble monofunctional monomer to the water-soluble multifunctional monomer in the water-soluble monomer mixture is from 1:3 to 1:4.

11. The heat storage microcapsules of item 1 above, wherein an amount of the hydrophobic resin constituting the shell is from 5 to 50 parts by mass based on 100 parts by mass of the microcapsules.

12. The heat storage microcapsules of item 1 above, wherein an amount in the core of the polymer derived from the water-soluble monomer mixture is from 2 to 50 parts by mass based on 100 parts by mass of the water-soluble latent heat storage material.

13. The heat storage microcapsules of item 1 above, wherein the microcapsule heat storage microcapsules have an average particle size of from 0.5 to 60 µm.

14. A method of manufacturing heat storage microcapsules, the method comprising the steps of:

(a) dispersing, in a water immiscible organic solvent, an aqueous solution containing at least one latent heat storage material selected from a salt hydrate and a sugar alcohol and a water-soluble monomer mixture of a water-soluble monofunctional monomer and a water-soluble multifunctional monomer;

(b) conducting radical polymerization of the water-soluble monomer mixture to produce a polymer derived from the water-soluble monomer mixture, thereby forming a core composed of the polymer and the latent heat storage material; and (c) forming, on the surface of the core, a shell composed of at least one of polyamide, polyurethane, polyurea, polyurethaneurea and polyester by interface polycondensation.

15. A method of manufacturing heat storage microcapsules, the method comprising the steps of:

(a) dispersing, in a water immiscible organic solvent, an aqueous solution containing a water-soluble monomer mixture of a water-soluble monofunctional monomer and a water-soluble multifunctional monomer;

(b) conducting radical polymerization of the water-soluble monomer mixture in the presence of a water-soluble radical initiator to produce a polymer derived from the water-soluble monomer mixture, thereby forming a first core composed of the polymer and water;

(c) substituting the water in the first core with an aqueous solution containing at least one water-soluble latent heat storage material selected from a salt hydrate and a sugar alcohol to form a second core composed of the polymer and the water-soluble latent heat storage material; and (d) forming, on the surface of the second core, a shell composed of at least one of polyamide, polyurethane, polyurea, polyurethaneurea and polyester by interface polycondensation.

The present invention can provide heat storage microcapsules in which a water-soluble latent heat storage material is encapsulated with stability and certainty. Further, the present invention can provide heat storage microcapsules suppressing phase separation phenomenon of an inorganic salt hydrate latent heat storage material, heat storage microcapsules suppressing of supercooling phenomenon of a latent heat storage material and a manufacturing method thereof.

The microcapsules of the present invention is obtained according to a method which comprises the steps of dispersing in a water immiscible organic solvent a water-soluble latent heat storage material together with a water-soluble monomer including at least a water-soluble multifunctional monomer to form a W/O emulsion, conducting radical polymerization in the presence of a water-soluble radical polymerization initiator to prepare a three dimensionally cross-linked polymer particles (cores) containing the water-soluble latent heat storage material, and forming on the surface of the particles a hydrophobic resin layer. This method the water-soluble latent heat storage material can be encapsulated in the cores with stability and certainty, and supercooling or phase separation of the water-soluble heat storage material can be prevented by the viscosity increasing effect due to a water-soluble gel matrix.

In the invention, a dispersion containing a water-soluble latent heat storage material and an aqueous monomer including at least one water-soluble multifunctional monomer is subjected to polymerization to form a core, and the core is covered with a hydrophobic resin, thereby forming microcapsules.

Next, compounds usable in the invention and a microcapsule formation method will be explained in detail.

(Hydrophobic Polymer)

The hydrophobic resin is a resin insoluble in water, and a film formed therefrom does not penetrate water. As the hydrophobic resin employed, polyamide, polyurethane, polyurea, polyurethaneurea or polyester is preferred, and polyamide or polyurethane is more preferred. As is described later, the hydrophobic resin shell can be formed by a method in which an oleophilic component to constitute the hydrophobic resin, the oleophilic component being dissolved in a water immiscible organic solvent, is brought into contact with a core in which a water-soluble component to constitute the hydrophobic resin is incorporated, followed by interface polymerization.

(Water-Soluble Latent Heat Storage Material)

"Water soluble" means to have a water-soluble property.

Next, a salt hydrate or a sugar alcohol, each of which is a representative example of a water-soluble latent heat storage material, will be explained.

The salt hydrate is selected from one or more hydrates of magnesium chloride, sodium acetate, aluminum sulfate, ammonium aluminum sulfate, ammonium potassium sulfate, magnesium sulfate and sodium phosphate.

The sugar alcohol is selected from xylitol, threitol, erythritol, galactitol, iditol and dulcitol.

In the invention, the sugar alcohol is preferably employed as the water-soluble latent heat storage material.

The salt hydrate or the sugar alcohol is dispersed in a water immiscible organic solvent in the form of the aqueous solution. The salt hydrate or the sugar alcohol is contained in the aqueous solution in an amount of preferably 50 to 100 parts by mass based on 100 parts by mass of water.

The manufacturing method of the invention comprises the steps of incorporating and dispersing in a water immiscible organic solvent an aqueous solution containing the water-soluble latent heat storage material as described above, i.e., the salt hydrate (as described above, inorganic salt hydrate in most cases) or the sugar alcohol and the water-soluble monomer mixture as described above of a water-soluble monofunctional monomer and a water-soluble multifunctional monomer to form dispersed particles, and conducting polymerization reaction of the particles to form stable water-soluble latent heat storage material-containing particles which constitute a core.

(Water-Soluble Monomer Mixture)

In the invention, a water-soluble monomer mixture is employed which contains a water-soluble monofunctional monomer and a water-soluble multifunctional monomer. Examples of the water-soluble monofunctional monomer include (meth)acrylamides such as (meth)acrylamide, dimethyl(meth)acrylamide, diethyl(meth)acrylamide, propyl(meth)acrylamide, isopropyl(meth)acrylamide, dimethylaminopropyl(meth)acrylamide, and hydroxyethyl(meth)acrylamide; alkylene glycol mono(meth)acrylates such as ethylene glycol mono(meth)acrylate, propylene glycol mono(meth)acrylate, ethylene glycol-tetramethylene glycol mono(meth)acrylate, propylene glycol-tetramethylene glycol mono(meth)acrylate, and ethylene glycol-propylene glycol-tetramethylene glycol mono(meth)acrylate; (meth)acrylic acid or its salts; and N-vinyl pyrrolidone.

Examples of the polyfunctional water-soluble monomer include bis(meth)acrylamides such as methylene bis(meth)acrylamide and ethylene bis(meth)acrylamide; alkylene glycol di(meth)acrylates such as ethylene glycol di(meth)acrylates, propylene glycol di(meth)acrylates, ethylene glycol-tetramethylene glycol di(meth)acrylates, propylene glycol-tetramethylene glycol di(meth)acrylates, and ethylene glycol-propylene glycol-tetramethylene glycol di(meth)acrylate; pentaerythritol diallyl ether; pentaerythritol triallyl ether; pentaerythritol tetraallyl ether; trimethylol propane triallyl ether; trimethylol propane diallyl ether; and ethylene glycol diallyl ether.

In the water-soluble monomer mixture employed, the ratio by mass of the monofunctional water-soluble monomer to the polyfunctional water-soluble monomer is preferably from 1:3 to 1:4.

(Water-Soluble Radical Polymerization Initiator)

These are polymerized employing a water-soluble radical polymerization initiator. Examples of the water-soluble radical polymerization initiator include a persulfate such as potassium persulfate or ammonium persulfate, and an azobis compound such as azobiscyanovaleric acid, 2,2'-azobis(2-amidinopropane)dihydrochloride or 2,2'-azobis[2-(5-methyl-2-imidazoline-2-yl)propane]dihydrochloride. A water-soluble peroxide such as hydrogen peroxide or cumene hydroperoxide is preferably employed. Further, a well-known redox polymerization initiator such as hydrogen peroxide-ascorbic acid, ammonium persulfate-sodium metabisulfite or potassium persulfate-sodium metabisulfite is also preferably employed.

The polymer derived from the water-soluble monomer mixture is contained in an amount of preferably from 2 to 50 parts by mass and more preferably from 3 to 30 parts by mass based on 100 parts by mass of the water-soluble latent heat storage material. The water-soluble radical polymerization initiator is added in an amount of preferably from 0.1 to 5 parts by mass and more preferably from 0.5 to 3 parts by mass based on 100 parts by mass of the water-soluble monomer.

(Hydrophobic Resin as Shell Material)

The surface of the core, which has been formed by polymerization of the water-soluble monomer mixture as described above and in which the water-soluble latent heat storage material is contained, is covered with a hydrophobic resin to form a shell of the hydrophobic resin. Examples of the hydrophobic resin include polyamide, polyurethane, polyurea, polyurethaneurea, and polyester.

The hydrophobic resin shell is easily formed by interface polycondensation. For example, a polyamide shell can be formed according to a method comprising incorporating a polyamine compound in the core, which has been formed by polymerization of the water-soluble monomer mixture as described above and in which the water-soluble latent heat storage material is contained, and then adding to the core with the polyamine compound incorporated a solution in which an acid chloride compound is dissolved in a water immiscible organic solvent to form a polyamide shell on the core surface. In the same way as above, a polyurethane shell can be formed according to a method in which a polyhydric alcohol is incorporated in the core and a solution in which a diisocyanate compound is dissolved in a water immiscible organic solvent is added to the core. A polyurea shell can be formed according to a method in which a polyamine compound is incorporated in the core and a solution in which a diisocyanate compound is dissolved in a water immiscible organic solvent is added to the core. A polyurethaneurea shell can be formed according to a method in which a polyhydric alcohol and a polyamine compound are incorporated in the core and a solution in which a diisocyanate compound is dissolved in a water immiscible organic solvent is added to the core. A polyester shell can be formed according to a method in which a polyhydric alcohol is added to the core and a solution in which an acid chloride compound is dissolved in a water immiscible organic solvent is added to the core. Thus, microcapsules having a shell on the core surface can be obtained.

As the acid chloride, a dibasic acid chloride compound is used. Examples thereof include phthalic acid chloride, isophthalic acid chloride, adipic acid chloride, maleic acid chloride, itaconic acid chloride, fumaric acid chloride, and sebatic acid chloride. Examples of the polyhydric alcohol include an alkylene glycol such as hexamethylene glycol, glycerin and pentaerythritol. Examples of the polyamine compound include an alkylene diamine such as ethylene diamine or hexamethylene diamine. Examples of the diisocyanate compound include hexamethylene diisocyanate and isophorone diisocyanate.

The shell material is preferably employed in a greater amount in order to give sufficient strength to the microcapsules and prevent leakage of the water-soluble latent heat storage material from the core, but on the other hand, the shell material is preferably employed in a smaller amount in order to increase the quantity of storage heat per unit mass. The shell material content of the microcapsules of the invention is preferably from 5 to 50 parts by mass, and more preferably from 10 to 30 parts by mass, based on 100 parts by mass of the microcapsules. The shell material is preferably three dimensionally cross-linked in order to improve the strength or the heat resistance. In order to form the three dimensionally cross-linked structure, a monomer having two or more functional groups is preferably used.

(Particle Size of Microcapsules)

The heat storage microcapsules of the invention have an average particle size of preferably from 0.1 to 100 μm. The average particle size of the heat storage microcapsules is more preferably from 0.5 to 60 μm, in view of ease of handling. The average particle size can be arbitrarily adjusted by selection of kinds or concentration of a surfactant employed or by adjustment of stirring energy during dispersion. The average particle size of the heat storage microcapsules is defined as a volume based average particle size measured according to a wet method employing a laser diffraction particle size distribution analyzer HELOS & RODOS (produced by Sympatec Co. Ltd.).

(Water Immiscible Organic Solvent)

Examples of the water immiscible organic solvent include a hydrocarbon solvent such as n-hexane or kerosene; a halogen-containing solvent such as methylene chloride or methylene chloride; and an aromatic hydrocarbon solvent such as benzene, toluene or xylene.

(Oil Soluble Surfactant)

As the oil soluble surfactant, surfactants capable of forming a W/O emulsion are employed. These surfactants are preferably those having a value represented by HLB being from 3 to 8. The surfactant employed is selected from among those having an HLB of from 3 to 8. Examples thereof include sorbitan trioleate (HLB: 3.4), sorbitan monooleate (HLB: 6.4), sorbitan monostearate (HLB: 6.4), and the like.

(Manufacturing Method of Microcapsules)

The microcapsule manufacturing method of the invention comprises the steps of (a) dispersing an aqueous solution containing a water-soluble heat storage material and a water-soluble monomer mixture of a water-soluble monofunctional monomer and a water-soluble multifunctional monomer in a water immiscible organic solvent containing an oil soluble surfactant; (b) conducting radical polymerization in the presence of a water-soluble radical polymerization initiator added before or after the dispersion to produce polymer particles containing the water-soluble heat storage material in the water-soluble polymer matrix; (c) adding a water-soluble component of monomers for forming a shell in advance or incorporating a water-soluble component of monomers for forming a shell into the water-soluble polymer matrix after the polymerization; and (d) conducting interface polymerization to produce a hydrophobic resin and form a shell composed of the hydrophobic resin on the water-soluble polymer matrix.

Another microcapsule manufacturing method of the invention comprises the steps of (a) dispersing an aqueous solution containing a water-soluble monomer in a water immiscible organic solvent containing an oil soluble surfactant; (b) conducting radical polymerization in the presence of a water-soluble radical polymerization initiator added before or after the dispersion to produce water-soluble polymer matrix particles; (c) drying the water-soluble polymer matrix particles and incorporating the dried water-soluble polymer matrix particles in an aqueous solution containing a water-soluble heat storage material to absorb the aqueous water-soluble heat storage material solution into the particles or incorporating, without drying, the water-soluble polymer matrix particles in an aqueous solution containing a water-soluble heat storage material to substitute water in the water-soluble polymer matrix particles with the aqueous water-soluble heat storage material solution, preparing the resulting water-soluble polymer matrix particles containing the aqueous water-soluble heat storage material solution and re-dispersing it in a water immiscible organic solvent; (d) adding a water-soluble component of monomers for forming a shell in advance or incorporating a water-soluble component of monomers for forming a shell into the water-soluble polymer matrix after the polymerization; and (e) conducting interface polymerization to produce a hydrophobic resin and form a shell composed of the hydrophobic resin on the water-soluble polymer matrix.

EXAMPLES

Next, the present invention will be explained referring to the following examples, however, the invention is not specifically limited.

Example 1

Diethylenetriamine of 0.5 g, 10 g of erythritol, 0.3 g of methylene bisacrylamide, 0.1 g of acrylamide and 0.05 g of potassium persulfate are dissolved in 10 ml of pure water to prepare an aqueous phase. Sorbitan monooleate of 1.2 g was dissolved in 120 ml of kerosene to prepare an oil phase. The aqueous phase obtained above was added to the oil phase and stirred at a stirring speed of 3000 rpm to prepare a W/O dispersion solution. The resulting dispersion solution was subjected to radical polymerization reaction while stirring at a stirring speed of 200 rpm at a reaction temperature of 70° C. for 8 hours. Subsequently, a solution in which 1.0 g of phthalic acid dichloride was dissolved in 30 ml of kerosene was dropwise added to the resulting reaction solution while stirring at a stirring speed of 150 rpm at a reaction temperature of 60° C. After addition, the emulsion was further reacted for additional 24 hours, filtered to obtain microcapsules, washed with water and dried. Thus, inventive microcapsule sample 1 was prepared. The average particle size of the inventive microcapsule sample 1 was 15 µm. In this example, no erythritol was found in the oil phase filtrate obtained after the filtration.

Example 2

Inventive microcapsule sample 2 was prepared in the same manner as in inventive microcapsule sample 1 above, except that xylitol was used instead of erythritol. The average particle size of the inventive microcapsule sample 2 was 13 µm. In this example, no xylitol was found in the oil phase filtrate obtained after the filtration.

Example 3

Inventive microcapsule sample 3 was prepared in the same manner as in inventive microcapsule sample 1 above, except that sodium acetate trihydrate was used instead of erythritol. The average particle size of the inventive microcapsule sample 3 was 16 µm. In this example, no sodium acetate trihydrate was found in the oil phase filtrate obtained after the filtration.

Example 4

Methylene bisacrylamide of 0.5 g, 0.2 g of acrylamide and 0.05 g of potassium persulfate were dissolved in 10 ml of pure water to prepare an aqueous phase. Sorbitan monooleate of 1.5 g was dissolved in 120 ml of n-hexane to prepare an oil phase. The aqueous phase obtained above was added to the oil phase and stirred at a stirring speed of 3000 rpm to prepare a W/O dispersion solution. The resulting dispersion solution was subjected to radical polymerization reaction while stirring at a stirring speed of 200 rpm at a reaction temperature of 70° C. for 8 hours. Subsequently, the resulting particles were extracted, dried and then added to an aqueous solution in which 0.5 g of diethylene triamine and 10 g of erythritol were dissolved in 10 ml of water so that the particles absorbed the aqueous solution. The resulting aqueous solution was added to an oil phase in which 1.5 g of sorbitan monooleate were dissolved in 120 ml of n-hexane, heated to 50° C. while stirring at a stirring speed of 150 rpm, and then dropwise added with a solution in which 1.0 g of phthalic acid dichloride was dissolved in 30 ml of n-hexane while stirring at a stirring speed of 150 rpm at a reaction temperature of 60° C. After the addition, the resulting solution was further reacted for additional 24 hours, filtered to obtain microcapsules, washed with water and dried. Thus, inventive microcapsule sample 4 was prepared. The average particle size of the inventive microcapsule sample 4 was 8 μm. In this example, no erythritol was found in the oil phase filtrate obtained after the filtration.

Comparative Example 1

Diethylenetriamine of 0.5 g, 10 g of erythritol, and 0.05 g of potassium persulfate are dissolved in 10 ml of pure water to prepare an aqueous phase. Sorbitan monooleate of 1.2 g was dissolved in 120 ml of kerosene to prepare an oil phase. The aqueous phase obtained above was added to the oil phase and stirred at a stirring speed of 3000 rpm to prepare a W/O dispersion solution. The resulting dispersion solution was dropwise added with a solution in which 1.0 g of phthalic acid dichloride was dissolved in 30 ml of kerosene while stirring at a stirring speed of 150 rpm at a reaction temperature of 60° C. After addition, the emulsion was further reacted for additional 24 hours, filtered to obtain microcapsules, washed with water and dried. Thus, comparative microcapsule sample 1 was prepared. The average particle size of the comparative microcapsule sample 1 was 12 μm. In this comparative example, erythritol was found in the oil phase filtrate obtained after the filtration.

Comparative Example 2

Comparative microcapsule sample 2 was prepared in the same manner as in comparative microcapsules 1 above, except that sodium acetate trihydrate was used instead of erythritol. The average particle size of the comparative microcapsule sample 2 was 10 μm. In this comparative sample, the sodium acetate trihydrate was found in the oil phase filtrate obtained after the filtration.

(Evaluation)

Heat history of each of the inventive microcapsule samples 1 through 4 and comparative microcapsule samples 1 and 2 was measured employing a differential scanning calorimeter DSC MODEL 7 (produced by Perkin Elmer Co., Ltd.). Thus, heat history of 2±0.2 g of each microcapsule sample was measured at a temperature raising rate of 10° C./minute and then lowered at a temperature lowering rate of 10° C./minute. The onset temperature at the rise of the endothermic peak of the heat content curve (point of intersection between a tangent line of the base line and a tangent line of the endothermic curve), which results from melt of the heat storage material encapsulated in the microcapsules, is defined as a melting point, the onset of the rise of the exothermic peak of the heat content curve (point of intersection of the base line and a tangent line of the exothermic curve as a solidifying point, and an integrated value of differences between the base line and the endothermic peak in the heat content curve at temperature raising as heat of melting.

Further, a difference |ΔT1| between the melting point and solidifying point of each microcapsule sample obtained above and measured and a difference |ΔT2| between the melting point and solidifying point of each microcapsule sample after a melt and solidification cycle was repeated 300 times were determined. From the resulting |ΔT1| and |ΔT2| obtained above, a rate (%) of variation of temperature difference was calculated according to the following formula.

Rate (%) of variation of temperature difference=100−|(|ΔT1|−|ΔT2|)|×100/ΔT1 wherein |ΔT1| represents the difference between the melting point and solidifying point of a microcapsule sample before a melt and solidification cycle is carried out, and |ΔT2| represents the difference between the melting point and solidifying point of a microcapsule sample after the melt and solidification cycle has been repeated 300 times.

A microcapsule sample having a rate of variation of temperature difference closer to 100% provides less aging variation of the temperature difference between the melting point and solidifying point, and therefore provides higher repetition stability (thermal fatigue resistance). A microcapsule sample having a rate of variation of temperature difference of from 90% to less than 95% is rated as acceptable, and a microcapsule sample having a rate of variation of temperature difference of not less than 95% is rated as excellent.

Further, five grams of each of the inventive microcapsule samples 1 through 4 and comparative microcapsule samples 1 and 2 were measured for quantity of storage heat, the temperature being varied from the phase change temperature minus 50° C. to the phase change temperature plus 20° C., and the temperature variation cycle being repeated 300 times. One temperature variation cycle is a process in which temperature was raised over a period of one hour, maintained at a temperature of the phase change temperature plus 20° C. for 30 minutes, then lowered over a period of one hour, and finally maintained at the phase change temperature minus 50° C. for 30 minutes. As is shown in the following formula, the percentage of a value obtained by dividing the quantity Q2 of storage heat of each microcapsule sample after the temperature variation cycle was repeated 300 times by the initial quantity Q1 of storage heat of each microcapsule sample was defined as a rate of variation of heat history.

Rate (%) of variation of heat history=Q2/Q1×100

A microcapsule sample having a rate of variation of heat history closer to 100% provides higher retention of quantity of storage heat, i.e., higher durability. A microcapsule sample having a rate of heat history variation of from 90% to less than 95% is rated as acceptable, and a microcapsule sample having a rate of heat history variation of not less than 95% is rated as excellent.

The evaluation results are shown in Table 1.

TABLE 1

| Microcapsule sample | Rate of variation of temperature difference (%) | Rate of variation of heat history (%) |
|---|---|---|
| Inventive microcapsule sample 1 | 97 | 98 |
| Inventive microcapsule sample 2 | 98 | 98 |
| Inventive microcapsule sample 3 | 94 | 92 |
| Inventive microcapsule sample 4 | 96 | 98 |
| Comparative microcapsule sample 1 | 89 | 84 |
| Comparative microcapsule sample 2 | 63 | 59 |

As is apparent from Table 1, the inventive microcapsule samples provide excellent repetition stability (excellent thermal fatigue property) and excellent durability. In contrast, the comparative microcapsule samples 1 and 2 provide poor repetition stability (thermal fatigue property) and poor durability, and particularly, comparative micro capsule sample 2 is extremely poor both in repetition stability (thermal fatigue property) and in durability

What is claimed is:

1. Heat storage microcapsules comprising
a core covered with a shell,
wherein the core contains (a) at least one water-soluble latent heat storage material selected from a salt hydrate and a sugar alcohol and (b) a polymer derived from a water-soluble monomer mixture of a water-soluble monofunctional monomer and a water-soluble multifunctional monomer,
the polymer forms a three dimensionally crosslinked polymer matrix obtained from polymerization of the water-soluble monomer mixture of the water-soluble monofunctional monomer and the water-soluble multifunctional monomer in the presence of the water-soluble latent heat storage material,
the water-soluble latent heat storage material is contained in the three dimensionally crosslinked polymer matrix, and
the shell is composed of a hydrophobic resin, wherein the water-soluble monofunctional monomer is at least one selected from the group consisting of (meth)acrylamides, alkylene glycol mono(meth)acrylates, (meth)acrylic acid or its salts and N-vinyl pyrrolidone, and the water-soluble multifunctional monomer is at least one selected from the group consisting of bis(meth)acrylamides, alkylene glycol di(meth)acrylates, pentaerythritol diallyl ether, pentaerythritol triallyl ether, pentaerythritol tetraallyl ether, trimethylol propane triallyl ether, trimethylol propane diallyl ether and ethylene glycol diallyl ether.

2. The heat storage microcapsules of claim 1, wherein the hydrophobic resin is at least one selected from the group consisting of polyamide, polyurethane, polyurea, polyurethaneurea and polyester.

3. The heat storage microcapsules of claim 2, wherein the hydrophobic resin is polyamide or polyurethane.

4. The heat storage microcapsules of claim 1, wherein the water-soluble latent heat storage material is the salt hydrate.

5. The heat storage microcapsules of claim 4, wherein the salt hydrate is at least one selected from the group consisting of one or more hydrates of magnesium chloride, sodium acetate, aluminum sulfate, ammonium aluminum sulfate, ammonium potassium sulfate, magnesium sulfate and sodium phosphate.

6. The heat storage microcapsules of claim 1, wherein the water-soluble latent heat storage material is the sugar alcohol.

7. The heat storage microcapsules of claim 6, wherein the sugar alcohol is at least one selected from the group consisting of xylitol, threitol, erythritol, galactitol, iditol and dulcitol.

8. The heat storage microcapsules of claim 1, wherein the water-soluble monofunctional monomer is at least one selected from the group consisting of (meth)acrylamides, alkylene glycol mono(meth)acrylates, (meth)acrylic acid or its salts and N-vinyl pyrrolidone, and the water-soluble multifunctional monomer is at least one selected from the group consisting of bis(meth)acrylamides, alkylene glycol di(meth)acrylates, pentaerythritol diallyl ether, pentaerythritol triallyl ether, pentaerythritol tetraallyl ether, trimethylol propane triallyl ether, trimethylol propane diallyl ether and ethylene glycol diallyl ether.

9. The heat storage microcapsules of claim 1, wherein a content rate by mass of the water-soluble monofunctional monomer to the water-soluble multifunctional monomer in the water-soluble monomer mixture is from 1:3 to 1:4.

10. The heat storage microcapsules of claim 1, wherein an amount of the hydrophobic resin constituting the shell is from 5 to 50 parts by mass based on 100 parts by mass of the microcapsules.

11. The heat storage microcapsules of claim 1, wherein an amount in the core of the polymer derived from the water-soluble monomer mixture is from 2 to 50 parts by mass based on 100 parts by mass of the water-soluble latent heat storage material.

12. The heat storage microcapsules of claim 1, wherein the microcapsule heat storage microcapsules have an average particle size of from 0.5 to 60 μm.

13. A method of manufacturing heat storage microcapsules of claim 1, the method comprising the steps of:
(a) dispersing, in a water immiscible organic solvent, an aqueous solution containing at least one latent heat storage material selected from a salt hydrate and a sugar alcohol and a water-soluble monomer mixture of a water-soluble monofunctional monomer and a water-soluble multifunctional monomer;
(b) conducting radical polymerization of the water-soluble monomer mixture to produce a polymer derived from the water-soluble monomer mixture, thereby forming a core composed of the polymer and the latent heat storage material; and
(c) forming, on the surface of the core, a shell composed of at least one of polyamide, polyurethane, polyurea, polyurethaneurea and polyester by interface polycondensation.

14. A method of manufacturing heat storage microcapsules of claim 1, the method comprising the steps of
(a) dispersing, in a water immiscible organic solvent, an aqueous solution containing a water-soluble monomer mixture of a water-soluble monofunctional monomer and a water-soluble multifunctional monomer;
(b) conducting radical polymerization of the water-soluble monomer mixture in the presence of a water-soluble radical initiator to produce a polymer derived from the water-soluble monomer mixture, thereby forming a first core composed of the polymer and water;
(c) substituting the water in the first core with an aqueous solution containing at least one water-soluble latent heat storage material selected from a salt hydrate and a sugar alcohol to form a second core composed of the polymer and the water-soluble latent heat storage material; and
(d) forming, on the surface of the second core, a shell composed of at least one of polyamide, polyurethane, polyurea, polyurethaneurea and polyester by interface polycondensation.

* * * * *